(No Model.)  2 Sheets—Sheet 1.

J. S. KLEIN.
PIPE COUPLING.

No. 365,387.  Patented June 28, 1887.

Witnesses,
Wm M Wilken
Robt. H. Porter.

Inventor,
John S. Klein
Per Hallock & Hallock
Att'ys.

(No Model.) 2 Sheets—Sheet 2.

J. S. KLEIN.
PIPE COUPLING.

No. 365,387. Patented June 28, 1887.

UNITED STATES PATENT OFFICE.

JOHN S. KLEIN, OF OIL CITY, PENNSYLVANIA.

PIPE-COUPLING.

SPECIFICATION forming part of Letters Patent No. 365,387, dated June 28, 1887.

Application filed June 8, 1886. Serial No. 204,516. (No model.)

*To all whom it may concern:*

Be it known that I, JOHN S. KLEIN, a citizen of the United States, residing at Oil City, in the county of Venango and State of Pennsylvania, have invented certain new and useful Improvements in Pipe-Couplings; and I do hereby declare the following to be a full, clear, and exact description of the invention, such as will enable others skilled in the art to which it appertains to make and use the same.

This invention relates to means for coupling conduit-pipes; and it consists in certain improvements in the construction of the same, as will be hereinafter fully described, and pointed out in the claims.

The object of this invention is to provide a coupling for gas, water, and other conduit-pipes which will operate without screw-threading the pipe, and which will utilize the pressure of the contained fluid to compress the packing-gasket.

My device is particularly useful in coupling large wrought-iron pipe, for the reason that as the pipe does not have to be screw-threaded it can be made as thin as desired—that is, it need be no thicker than is necessary to resist the pressure of the contained fluid—while if the pipe is to be screw-threaded it has to be much thicker than is often required.

Other advantages gained by my construction are economy of time in laying the pipe and an absolutely tight yet yielding joint.

Figure 1:
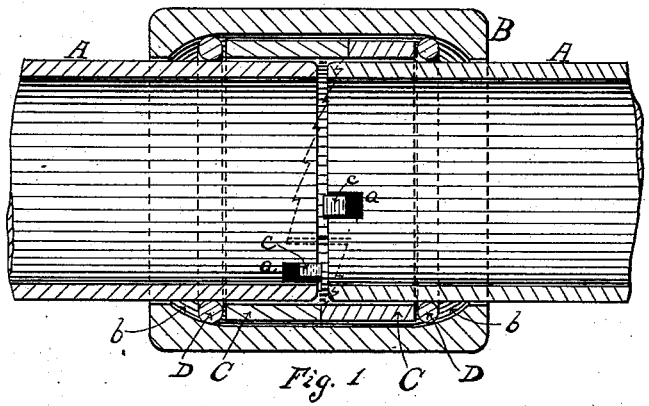
Figure 3:
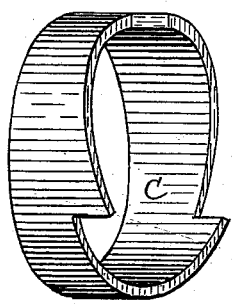
Figure 2:
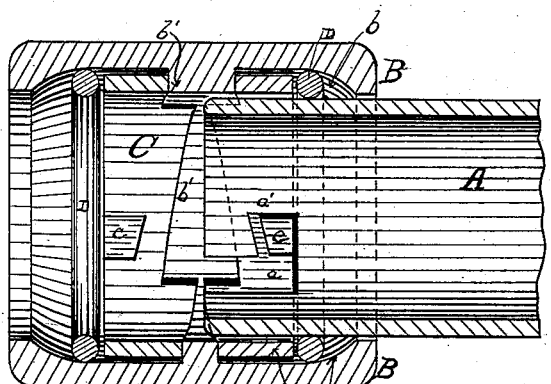
Figure 4:
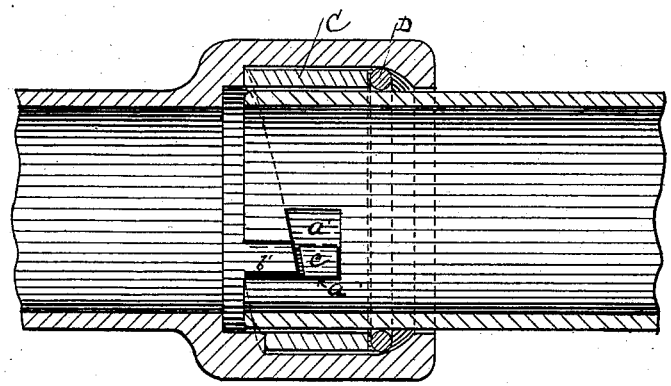
Figure 5:
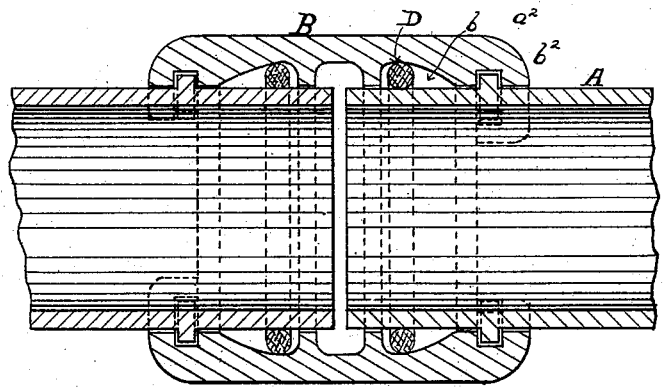
Figure 6:
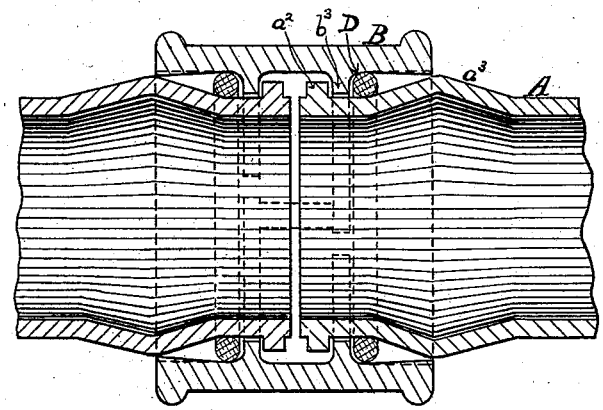
Figure 7:
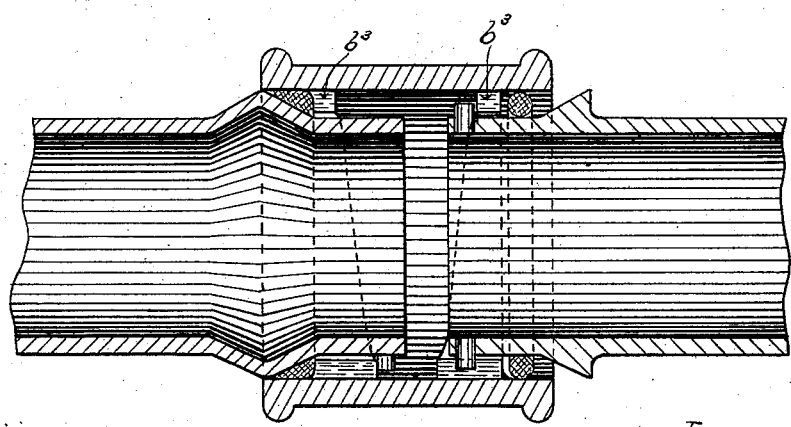

My invention is illustrated in the accompanying drawings, as follows:

Figure 1 is a longitudinal section through one of my couplings. Fig. 2 is a like view of a modified construction embodying the same general features as those shown in Fig. 1. Fig. 3 is a perspective view of one of the rings C, seen in the other figures. Fig. 4 is a section view like Fig. 1, and shows my coupler applied to cast-iron pipe or to one arm of a cast-iron T, or other branching coupling, and a wrought-iron main pipe. Figs. 5, 6, and 7 show other modified constructions.

The construction shown in Fig. 1 contains all the leading elements. The constructions shown in Figs. 2, 4, and 7 contain the same elements in different forms and differently disposed. The constructions shown in Figs. 5 and 6 omit one of the means for mechanically compressing the packing, leaving it to be compressed wholly by the pressure of the contained fluid.

The construction shown in Fig. 1 is as follows: A A are the pipe-sections to be coupled. B is the coupling-collar, which is recessed on its inner wall. C C are rings within the recess of the collar, and having cam or inclined faces which seat upon each other, and the two form an expansion-ring. D D are the packings or gaskets which lie in the annular spaces at the ends of the rings C C, and are compressed against the faces *b b* at the ends of the recess of the collar as the expansion-ring is expanded by turning one of the rings C upon the other. *a a* are notches cut in the ends of the pipes A A, and *c c* are lugs on the inner walls of the rings C, which fit in the notches *a a* in the pipe.

In constructing this coupling when it is made of cast metal, as shown, the rings C C are put in the core which forms the recess of the collar B when it is cast; but if the collar is made of two parts bolted together like common flange unions, then of course the ring may be put in before the two parts are bolted together.

The operation of this coupling is as follows: The packing-rings D D are put in place and the pipe ends are pushed in until the notches *a* engage the lugs *c*. Then, by holding one pipe and turning the other, or turning the two pipes in opposite directions, the rings C C will be expanded and drive the packing-rings against the faces *b b* of the recess in the collar and compress them so as to prevent any leakage. It will be seen that the fluid in the pipe will have access to the recess in the collar, and will exert all its pressure against the packing and drive it still closer into the space between the inclined faces *b b* and the pipe, and thus the pressure of the contained fluid is utilized to compress the packing. The cam-faces of the rings C may be ratcheted, as shown in Fig. 1, or not, as shown in the other figures.

The construction shown in Fig. 2 is such that the pipes A A may be held and the collar B be turned when making the connection. The rings C C, in place of setting upon each other, have their cam-faces seated on a cam-lug, *b'*, on the inner wall of the collar. Otherwise the construction does not differ from that shown in Fig. 1. In this figure I have shown the notch $a$ in the pipe made with an offset, $a'$, like a bayonet-coupling, so that the pipes cannot be drawn out of the coupling by any longitudinal movement of the conduit.

In Fig. 5 the construction is similar to that in Fig. 1, except that there is no expansion-ring to compress the packing, the pressure of the contained fluid being entirely relied upon to drive the packing into the contracting annular space formed by the face $b$ of the recess in the coupling and the pipe. In this construction the pipe is kept from coming out of the collar by pins or lugs $a^2$ on the pipe entering bayonet-grooves $b^2$ in the collar.

Fig. 6 shows a modification of the construction shown in Fig. 5. Here the pipe A has a bilge, $a^3$, formed in it, or, if it is a cast-iron pipe, it will be a circumferential enlargement, and the recess in the collar opens straight out, or nearly so, as desired, and on the inside wall of the collar near the middle are two ribs, $b^3$, with openings for the pins $a^2$ on the ends of the pipe to pass through. After the pipe is inserted it is turned and the pins $a^2$ engage with the ribs $b^3$, and the pipe is held against longitudinal movement. The contained fluid acts against the packing-rings D from within and drives them into the contracting space between the wall of the recess and the pipe.

In Fig. 7 the pipe is bulged and the recess in the collar opens outwardly, as in the construction shown in Fig. 6; but the ribs $b^3$ are made cam-formed, so that by turning the pipe it is drawn in upon the packing, and a tight joint is formed before the conduit is filled with fluid under pressure. As soon, however, as the conduit is filled with fluid under pressure the packing will be still more compressed. In this construction either the pipes or collar may be turned in making the connection.

In a companion application of even date herewith, and numbered 204,644, I have shown the construction shown in Fig. 7 in the accompanying drawings, and have there made specific claim to said construction, and I here disclaim said construction except as the same falls within the scope of the generic language of the following claims.

What I claim as new is—

1. In a pipe-coupling, the combination of a collar having an internal annular recess, a cam-ring within the said recess, a pipe-section connected with said ring, and a packing-ring around said pipe-section within said recess and between the end of said ring and the end of said collar, substantially as and for the purposes set forth.

2. In a pipe-coupling device, the combination of a collar having an internal annular recess which diminishes toward the end of the collar, a cam ring within said recess, a pipe-section connected with said ring, and a packing-ring around said pipe within said recess and between the end of said ring and the end of said collar, substantially as and for the purposes set forth.

3. In a pipe-coupling, the combination of the collar B, having internal annular recess, with converging ends $b$, the cam-rings C C, with lugs $c$ $c$, the pipe-sections A A, with notches $a$ $a$, and the packing-rings D D, said parts being arranged relatively as shown, and constructed and operated substantially as and for the purposes set forth.

4. In a pipe-coupling, the combination of the collar B, having internal annular recess and the internal rib, $b'$, with cam-faces, the rings C C, with cam-faces seated on the cam-faces of the rib $b'$, and the lugs $c$ $c$, the pipe-sections A, with notches $a$, engaging with the lugs $c$ on the rings C, and the packing-rings D D, contained within the annular recess at the outer ends of the rings C C, said parts being arranged substantially as and for the purposes set forth.

In testimony whereof I affix my signature in presence of two witnesses.

JOHN S. KLEIN.

Witnesses:
  ROBT. H. PORTER,
  JNO. K. HALLOCK.